United States Patent Office 2,798,804
Patented July 9, 1957

2,798,804

PROCESS OF PREPARING LIMONITIC ORES FOR SEPARATION OF METAL CONTENT

Courtney S. Simons III, Chalmette, La., assignor to Freeport Sulphur Company, New York, N. Y., a corporation of Delaware No Drawing. Application August 3, 1956, Serial No. 602,064

7 Claims. (Cl. 75—101)

This invention relates to the preparation of limonitic ores containing one or more valuable metals for the recovery of the valuable metal content.

For the recovery of nickel and cobalt from lateritic limonitic ores at high temperatures under pressure, it has been suggested that the raw ore be prepared by running the more or less finely divided ore through a grizzly, next forming a dilute slurry, screening to remove waste material, cycloning, grinding the coarse particles and returning the ground mass to the slurry, thereby producing a dilute slurry of 10 to 20% solids, then concentrating the slurry by settling and decanting in thickeners, the underflow having a concentration of 30 to 40% solids, and finally heating the concentrated slurry in an autoclave by means of direct steam to the high temperature at which the leaching or other recovery treatment is to be carried out, generally above about 400° F.

In this heating operation which raises the temperature from substantially the surrounding atmosphere to the said high temperature, a substantial amount of steam is consumed and this steam condenses in the slurry and dilutes the same to concentrations of 20 to 30% solids.

Inasmuch as the valuable metal content in the limonitic ores is quite low, the economy of the recovery operations is of prime importance. A purpose of the present invention is to reduce the ore preparation and heating costs and to lessen the volume of slurry to be treated in the subsequent leaching or other recovery operations.

The present invention provides a novel concentration and heating procedure for the dilute ore slurry hereinbefore described and unavoidably formed in the ore preparation operations. The process may be considered to involve, broadly, an initial heating of the dilute slurry of the defined limonitic ores, ordinarily containing at least about 5% or at most about 20% solids, to an intermediate temperature, as from 140° to 210° F., but preferably at about 160° to 180° F., then concentrating the ore by settling and decanting the same to provide a slurry containing suitably about 35 to 60% solids, preferably at least 40% solids, and finally heating the concentrated slurry by means of direct steam to the desired high temperature for the recovery action.

In a preferred embodiment of the process of the invention operating in continuous repetition, the clear water overflow discharged in the decanting operation described above, is utilized in the pulping of another batch of the ore to form the dilute slurry in the next cycle. In relation to the prior suggested process utilizing settling and decanting of the dilute slurry in the cold and then heating in a single step, this preferred process leads to a very considerable saving in heat consumption.

The process of the invention, whether the recycling step is utilized or not, is of still further advantage as to steam consumption in relation to the herein described prior practice where such practice is operated, because of necessity or expediency, in such manner as to provide a thickened slurry having less than about 33% solids. The slurry finally obtained after the second heating operation in all embodiments of the present invention is more concentrated than the final slurry of the prior suggested process, and hence the process of the invention has a substantial advantage in providing an ore mass of less volume to be heated to the final temperature and treated in the leaching operation, making it possible to use appreciably smaller autoclaves and the other subsequently used equipment, including thickeners, pumps, etc. Finally, the present invention has an advantage in the ore concentration operation, for the heated dilute slurry will settle more quickly and produce a more dense underflow than the unheated slurry of the prior process.

EXAMPLE 1

A lateritic limonitic ore containing small amounts of nickel, cobalt and other valuable metals, such as is found in the Moa Bay area of Cuba, which has been reduced to finely divided form of substantially all minus 100-mesh in a slurry of about 10% solids by the procedures hereinbefore described, is passed through a heater and heated by the introduction of direct steam at 240° F. to a temperature of about 160° F. The hot slurry is next flowed into a thickener where the solids rapidly settle. The underflow, at from 40–50% solids, is then pumped into one or more autoclaves and heated to 450–500° F. by the introduction of high pressure direct steam.

EXAMPLE 2

A quantity of the finely divided ore described in Example 1 was slurried with a hot clear overflow water having a temperature of 140° F. obtained in the thickening operation of a prior cycle of the process. This warm slurry, containing 12% solids was then passed through a heater and heated to a temperature of 160° F. and then through a thickener which provided an underflow slurry of about 45% solids. This thickened slurry was then pumped into an autoclave and heated to 475° F. by means of direct steam under a pressure of 550 p. s. i. g. The hot water overflow from the thickener was returned to the head of the system and used in the next cycle of the process to prepare the dilute slurry.

The following table refers to the two examples of the invention and illustrates the heat and equipment savings made possible by such practice in relation to prior suggested practice.

Table

[Basis: 100 pounds dry ore in 12% initial dilute slurry. Initial temperature 80° F., final temperature 475° F. Low pressure steam 10 p. s. i. g., high pressure steam 550 p. s. i. g.]

|  | Double Stage Heating with Intermediate Settling at 160° F. | | Single Stage Heating (Cold Settling) Prior Practice |
|---|---|---|---|
|  | Ex. 1 Without Recycle | Ex. 2 With Recycle | |
| Percent Solids in Thickened Slurry | 45 | 45 | 30 | 33 |
| Lbs. Low Pressure Steam Used | 59.0 | 14.7 | 37.8 | 33.0 |
| Lbs. High Pressure Steam Used | 62.7 | 62.7 | 102.8 | 88.5 |
| Lbs. Total Steam used | 121.7 | 77.4 | 140.6 | 121.5 |
| Percent Solids in Final Slurry | 35.1 | 35.1 | 21.0 | 23.8 |
| Retention Time for Settling, Hrs. | 16 | 16 | 22 | 24 |
| Relative Size of Thickeners | 0.82 | 0.82 | .96 | 1 |
| Relative Size of Process Equipment | 0.88 | 0.88 | 1.04 | 1 |

It should be understood that the present invention is not limited to the specific details of procedures or conditions hereindescribed but that it extends to all equivalents

I claim:

1. In the recovery of valuable metals from limonitic ore containing such metals involving the formation of a dilute slurry of the ore, the concentration of the slurry and heating the slurry under pressure to high temperatures, the improvement which comprises, heating the dilute slurry to an intermediate temperature, concentrating the slurry by settling the same, and heating the concentrated slurry by means of direct steam to the required high temperature.

2. In the recovery of valuable metals from limonitic ore containing such metals involving the formation of a dilute slurry of the ore, the concentration of the slurry and heating the slurry under pressure to high temperatures, the improvement which comprises, heating the dilute slurry to 140° to 210° F., concentrating the slurry by settling the same, and heating the concentrated slurry by means of direct steam to a temperature of 450° to 500° F.

3. In the recovery of valuable metals from limonitic ore containing such metals involving the formation of a dilute slurry of the ore, the concentration of the slurry and heating the slurry under pressure to high temperatures, the improvement which comprises, heating the dilute slurry to about 180° F., concentrating the slurry by settling the same, and heating the concentrated slurry by means of direct steam to a temperature of 450–500° F.

4. In the recovery of valuable metals from limonitic ore containing such metals involving the formation of a dilute slurry of the ore, the concentration of the slurry and heating the slurry under pressure to high temperatures, the improvement which comprises, heating the dilute slurry containing from 5 to 20% solids to an intermediate temperature, concentrating the slurry to provide 35–60% solids by settling the same, and heating the concentrated slurry by means of direct steam to the required high temperature.

5. In a continually operating process for the recovery of valuable metals from limonitic ore containing such metals involving the formation of a dilute slurry of the ore, the concentration of the slurry and heating the slurry under pressure to high temperatures, the improvement which comprises, heating the dilute slurry to an intermediate temperature, concentrating the slurry by settling and decanting the same, returning the decanted overflow of hot water and forming additional dilute slurry of the ore in the next cycle, and heating the concentrated slurry by means of direct steam to the required high temperature.

6. In a continually operating process for the recovery of valuable metals from limonitic ore containing such metals involving the formation of a dilute slurry of the ore, the concentration of the slurry and heating the slurry under pressure to high temperatures, the improvement which comprises, heating the dilute slurry of at most about 20% solids to an intermediate temperature, concentrating the slurry by settling and decanting the same to provide an underflow of at least 40% solids, returning the decanted overflow of hot water and forming additional dilute slurry of the ore in the next cycle, and heating the concentrated slurry by means of direct steam to the required high temperature.

7. The process of claim 6 wherein the intermediate temperature is from 140° to 200° F. and the final temperature above 400° F.

No references cited.